US011375163B2

(12) United States Patent
Terauchi et al.

(10) Patent No.: US 11,375,163 B2
(45) Date of Patent: Jun. 28, 2022

(54) VEHICLE INSPECTION DEVICE AND VEHICLE INSPECTION SYSTEM

(71) Applicant: HONDA MOTOR CO., LTD., Tokyo (JP)

(72) Inventors: Akira Terauchi, Wako (JP); Naoki Kato, Wako (JP); Kayoko Fukasawa, Wako (JP); Hiroyuki Tomosugi, Wako (JP); Takahiro Iijima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 121 days.

(21) Appl. No.: 17/023,908

(22) Filed: Sep. 17, 2020

(65) Prior Publication Data
US 2021/0092331 A1 Mar. 25, 2021

(30) Foreign Application Priority Data

Sep. 20, 2019 (JP) .............................. JP2019-170988

(51) Int. Cl.
| | | |
|---|---|---|
| *H04N 7/18* | (2006.01) | |
| *H04N 5/225* | (2006.01) | |
| *G06T 7/00* | (2017.01) | |
| *G06Q 30/06* | (2012.01) | |
| *B60R 1/074* | (2006.01) | |
| *B60R 1/12* | (2006.01) | |

(Continued)

(52) U.S. Cl.
CPC .............. *H04N 7/188* (2013.01); *B60R 1/006* (2013.01); *B60R 1/074* (2013.01); *B60R 1/12* (2013.01);
(Continued)

(58) Field of Classification Search
CPC .... H04N 7/188; H04N 5/2253; H04N 5/2252; H04N 7/183; H04N 5/23245;
(Continued)

(56) References Cited

U.S. PATENT DOCUMENTS 9,840,197 B2 * 12/2017 Baek .................... G06T 3/4038
10,515,535 B1 * 12/2019 Dhullipala Chenchu ..................
G06T 7/97
(Continued)

FOREIGN PATENT DOCUMENTS

| CN | 205971068 U | 2/2017 |
|---|---|---|
| JP | 2006-182234 A | 7/2006 |
| JP | 2013-191053 | 9/2013 |

OTHER PUBLICATIONS

Japanese Office Action with English translation dated Mar. 22, 2022, 7 pages.
Chinese Office Action dated Dec. 29, 2021, 6 pages.

*Primary Examiner* — James M Pontius
(74) *Attorney, Agent, or Firm* — Rankin, Hill & Clark LLP

(57) ABSTRACT

A vehicle inspection device includes a camera mounted to a power folding side-view mirror provided to a vehicle, the camera being configured to switch between an exterior image capture state in which an exterior of the vehicle is within an image capture range and an interior image capture state in which an interior of the vehicle is within the image capture range, while the side-view mirror performs an opening/closing operation between a completely open state and a closed state, and a vehicle processor that executes a vehicle image capture process of capturing an image of the exterior of the vehicle by the camera when the camera has entered the exterior image capture state due to an operation of the side-view mirror, and capturing an image of the interior of the vehicle by the camera when the camera has entered the interior image capture state due to an operation of the side-view mirror.

7 Claims, 5 Drawing Sheets

(51) Int. Cl.
    *B60R 1/00*     (2022.01)
    *G06V 20/59*    (2022.01)
(52) U.S. Cl.
    CPC ....... *G06Q 30/0645* (2013.01); *G06T 7/0002* (2013.01); *G06V 20/59* (2022.01); *H04N 5/2253* (2013.01); *B60R 2001/1253* (2013.01); *G06T 2207/30252* (2013.01); *G06T 2207/30268* (2013.01)
(58) Field of Classification Search
    CPC ...... H04N 5/2257; B60R 1/006; B60R 1/074; B60R 1/12; B60R 2001/1253; B60R 11/04; B60R 2300/10; G06Q 30/0645; G06Q 10/02; G06T 7/0002; G06T 2207/30252; G06T 2207/30268; G06T 2207/30156; G06T 7/0004; G06V 20/59; G06V 20/00; G07F 17/0057
    See application file for complete search history.

(56)            References Cited

U.S. PATENT DOCUMENTS

| | | | |
|---|---|---|---|
| 10,913,428 B2* | 2/2021 | Dingli | G07C 5/0866 |
| 11,270,570 B2* | 3/2022 | Woo | G06V 20/59 |
| 2015/0116103 A1* | 4/2015 | Yang | G08B 21/24 340/438 |
| 2016/0090040 A1* | 3/2016 | Marsh | B60R 1/00 348/148 |
| 2017/0210297 A1* | 7/2017 | Kim | G01S 17/931 |
| 2018/0022278 A1* | 1/2018 | Parat | B60R 1/00 348/148 |
| 2018/0093619 A1* | 4/2018 | Han | B60R 1/00 |
| 2018/0164831 A1* | 6/2018 | Han | B60R 1/00 |
| 2018/0272942 A1* | 9/2018 | Dudar | B60R 1/074 |
| 2018/0290594 A1* | 10/2018 | Abdel-Rahman | B60R 1/0607 |
| 2018/0322342 A1* | 11/2018 | Clifford | G06V 10/751 |
| 2019/0031105 A1* | 1/2019 | Kim | B60R 1/088 |
| 2019/0056749 A1* | 2/2019 | Kim | H04N 13/211 |
| 2019/0161014 A1* | 5/2019 | Ko | G02B 27/0006 |
| 2020/0151473 A1* | 5/2020 | Seidel | G06Q 50/30 |
| 2020/0156592 A1* | 5/2020 | Zaharia | B60R 1/00 |
| 2020/0175783 A1* | 6/2020 | Adams | G07C 5/0891 |
| 2020/0186689 A1* | 6/2020 | Outwater | H04N 5/2258 |
| 2020/0189460 A1* | 6/2020 | Park | B60R 16/02 |
| 2020/0349370 A1* | 11/2020 | Lambert | G06T 7/75 |
| 2021/0097316 A1* | 4/2021 | Il | G06V 20/59 |
| 2022/0057269 A1* | 2/2022 | Parameswaran | B60R 1/00 |
| 2022/0072997 A1* | 3/2022 | Berne | H04N 7/183 |

\* cited by examiner

[EXTERIOR IMAGE CAPTURE STATE]

[INTERIOR IMAGE CAPTURE STATE]

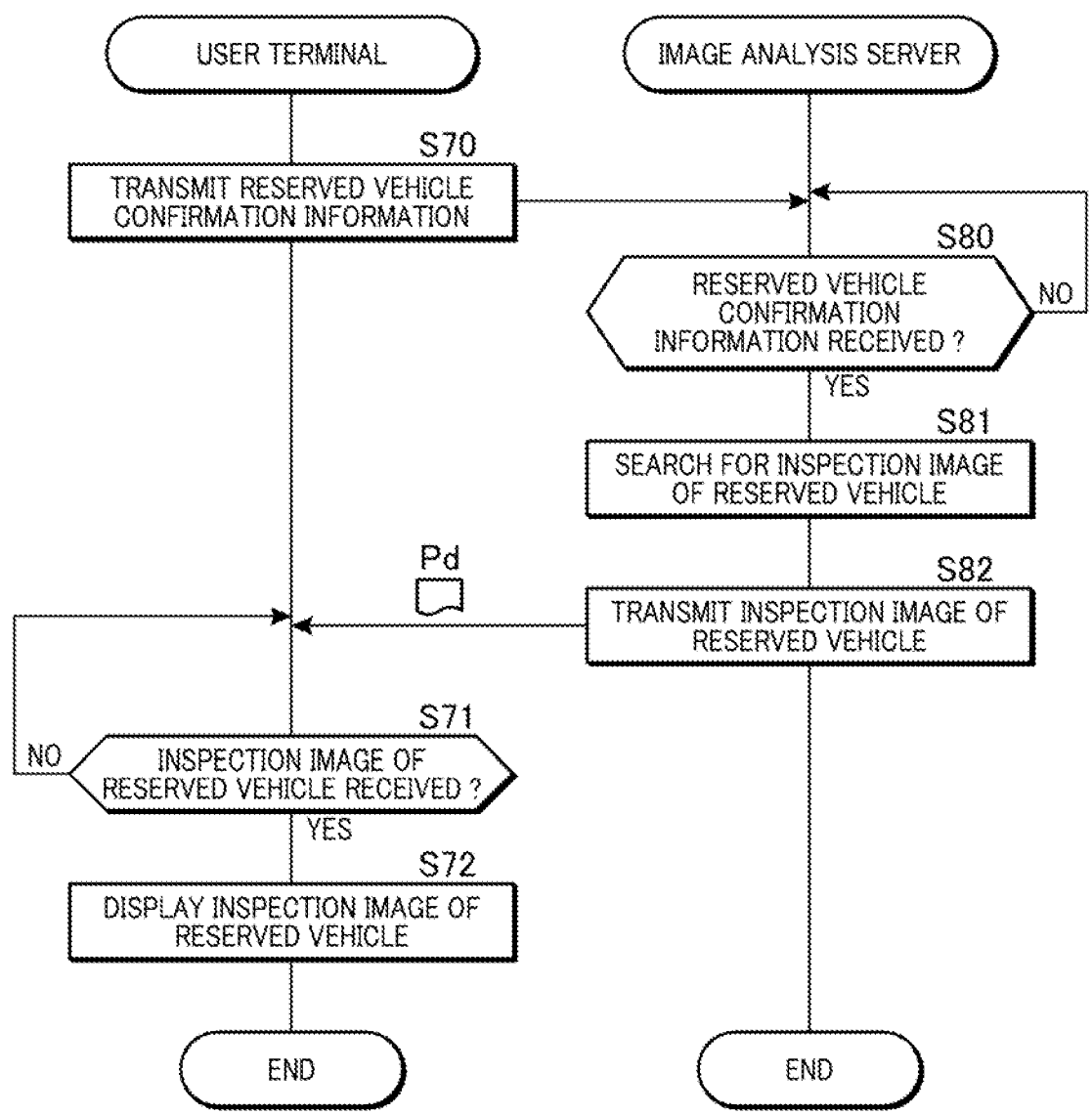

VEHICLE INSPECTION DEVICE AND VEHICLE INSPECTION SYSTEM

INCORPORATION BY REFERENCE

The present application claims priority under 35 U.S.C. § 119 to Japanese Patent Application No. 2019-170988 filed on Sep. 20, 2019. The content of the application is incorporated herein by reference in its entirety.

BACKGROUND OF THE INVENTION

Field of the Invention

The present invention relates to a vehicle inspection device and vehicle inspection system.

Description of the Related Art

In the conventional art, there has been proposed a vehicle interior inspection device which is provided near the center of the ceiling of a vehicle used for carsharing and the like, and which captures the image of the whole interior of the vehicle with a camera oriented toward the front, rear, left, and right (see, for example, JP 2013-191053).

The above vehicle interior inspection device compares captured images of the vehicle interior before and after use of the vehicle to recognize items left behind by a user or damage to the vehicle interior, and sends a notification to the user's mobile terminal or the business operator.

The above conventional vehicle interior inspection device inspects the interior of the vehicle, but there is also a demand for inspection of the exterior of the vehicle. In order to fulfil this demand, a camera for capturing the image of the exterior of the vehicle needs to be provided, but it would be preferable to prevent an increase in cost and design complexity of the image capture unit that adding another camera would entail.

Aspects of the present invention were made in view of this background, and has an object of providing a vehicle inspection device and vehicle inspection system that can capture an image of a vehicle interior and exterior while preventing an increase in cost and design complexity of the image capture unit.

SUMMARY OF THE INVENTION

A first aspect for achieving the above object is a vehicle inspection device including a camera mounted to a power folding side-view mirror provided to a vehicle, the camera being configured to switch between an exterior image capture state in which an exterior of the vehicle is within an image capture range and an interior image capture state in which an interior of the vehicle is within the image capture range, while the side-view mirror performs an opening/closing operation between a completely open state and a closed state, and a vehicle processor configured to execute a vehicle image capture process of capturing an image of the exterior of the vehicle by the camera when the camera has entered the exterior image capture state due to an operation of the side-view mirror, and capturing an image of the interior of the vehicle by the camera when the camera has entered the interior image capture state due to an operation of the side-view mirror.

In the above vehicle inspection device, the vehicle processor may be configured to execute the vehicle image capture process upon recognition of an automatic closing operation of the side-view mirror associated with locking of the vehicle.

In the above vehicle inspection device, the camera may be mounted only to a side-view mirror on a passenger seat side of the vehicle.

In the above vehicle inspection device, the vehicle may be a rental vehicle, and the vehicle processor may be configured to estimate a return time of the rental vehicle and execute the vehicle image capture process at the return time.

Next, a second aspect for achieving the above object is a vehicle inspection system including a vehicle inspection device which includes a camera mounted to a power folding side-view mirror provided to a vehicle, the camera being configured to switch between an exterior image capture state in which an exterior of the vehicle is within an image capture range and an interior image capture state in which an interior of the vehicle is within the image capture range, while the side-view mirror performs an opening/closing operation between a completely open state and a closed state, and a vehicle processor configured to execute a vehicle image capture process of capturing an image of the exterior of the vehicle by the camera when the camera has entered the exterior image capture state due to an operation of the side-view mirror and capturing an image of the interior of the vehicle by the camera when the camera has entered the interior image capture state due to an operation of the side-view mirror, and to transmit an image of the exterior and the interior of the vehicle captured by the vehicle image capture process, and an image analysis server having a server processor configured to receive the image of the exterior and the interior of the vehicle transmitted by the vehicle processor, and execute an image analysis process of analyzing the image of the exterior and the interior of the vehicle.

In the above vehicle inspection system, the server processor may be configured to determine, by the image analysis process, whether or not cleaning of the vehicle is necessary.

In the above vehicle inspection system, the vehicle may be a rental vehicle, and the server processor may be configured to, upon determining that a dirtiness of the rental vehicle is equal to or more than a predetermined level, suspend rental of the rental vehicle.

In the above vehicle inspection system, the vehicle may be a rental vehicle, and the server processor may be configured to determine, by the image analysis process, whether there is a left item in the interior of the rental vehicle, and upon determining that there is a left item, transmit left item notification information notifying a left item to a user terminal used by a user who used the rental vehicle.

Effects of the Invention

According to the vehicle inspection device of an aspect of the present invention, an opening/closing operation of a side-view mirror of a vehicle switches an image capture range of a camera mounted to the side-view mirror between an exterior image capture state and an interior image capture state, allowing for image capture of both the exterior and the interior of the vehicle. It is thus possible to prevent an increase in cost and design complexity of the image capture unit than in a case where a camera for capturing an image of the vehicle exterior and a camera for capturing an image of the vehicle interior are provided separately.

BRIEF DESCRIPTION OF THE DRAWINGS

FIG. 5 is a flowchart of a process of transmitting an inspection image of a reserved vehicle from an image analysis server to a user terminal responsive to a user request.

DETAILED DESCRIPTION OF THE PREFERRED EMBODIMENTS

Figure 1:
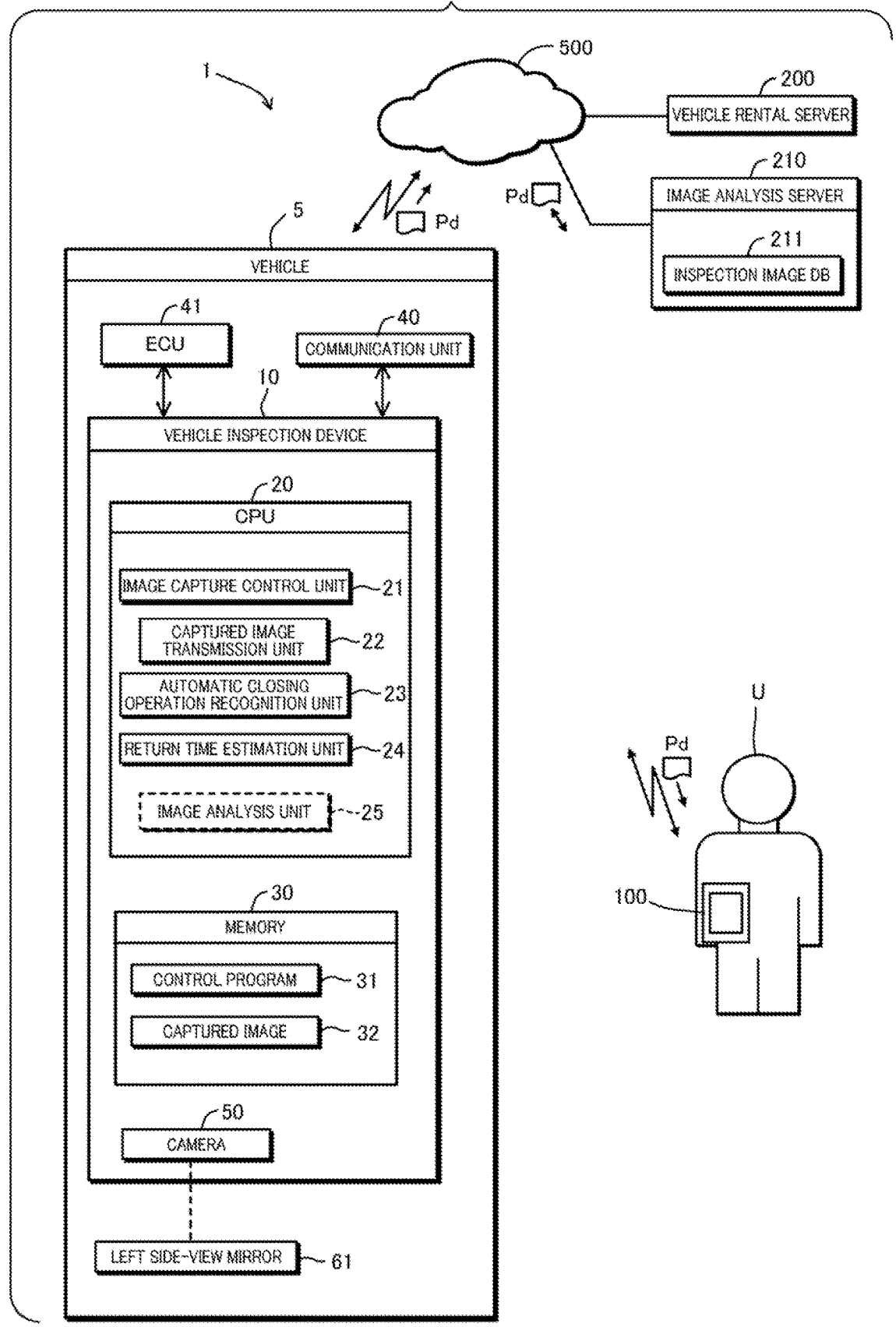
FIG. 1 shows the configuration of a vehicle inspection system.

1. Configuration of the Vehicle Inspection System

A configuration of a vehicle inspection system 1 according to the present embodiment will be described with reference to FIG. 1 and FIG. 2. The vehicle inspection system 1 is composed of a vehicle inspection device 10 installed in a vehicle 5 and an image analysis server 210. The vehicle inspection device 10 communicates with the image analysis server 210 via a communication unit 40 installed in the vehicle 5 and a communication network 500.

The vehicle 5 is a rental vehicle that is rented via a rental or carsharing service, and use of the vehicle 5 is managed by a vehicle rental server 200. The vehicle 5 is equipped with an electronic control unit (ECU) 41 that controls the overall operation of the vehicle 5. The image analysis server 210 is a computer system composed of a central processing unit (CPU, corresponding to the server processor according to the present invention), memory, communication unit, etc. (not shown). Via the communication network 500, the image analysis server 210 enables communication between a user terminal 100 used by a user U of the vehicle 5 and the vehicle rental server 200.

The vehicle inspection device 10 includes a camera 50 mounted to the left side-view mirror 61 of the vehicle 5. The image capture range of the camera 50 will be described with reference to FIG. 2. The right and left side-view mirrors 60, 61 of the vehicle 5 are power folding side-view mirrors. S1 in FIG. 2 shows an exterior image capture state, in which the left and right side-view mirrors 60, 61 are completely open and a left side of the exterior (side of the body) BD of the vehicle 5 is within an image capture range Ar1 of the camera 50 mounted to the left side-view mirror 61.

Figure 2:
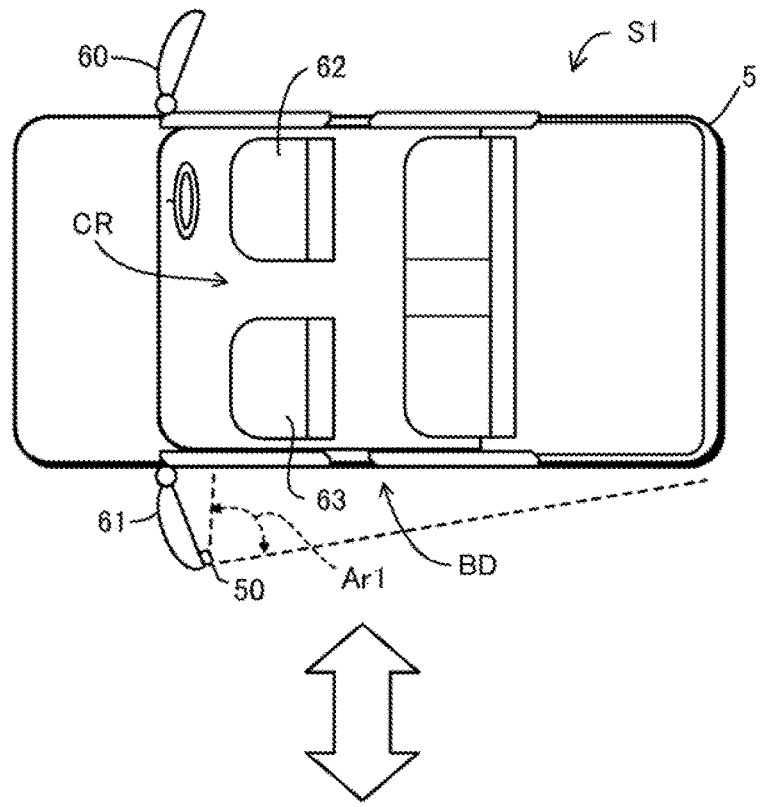
FIG. 2 depicts an image capture range of a camera mounted to a side-view mirror.
Figure 2:
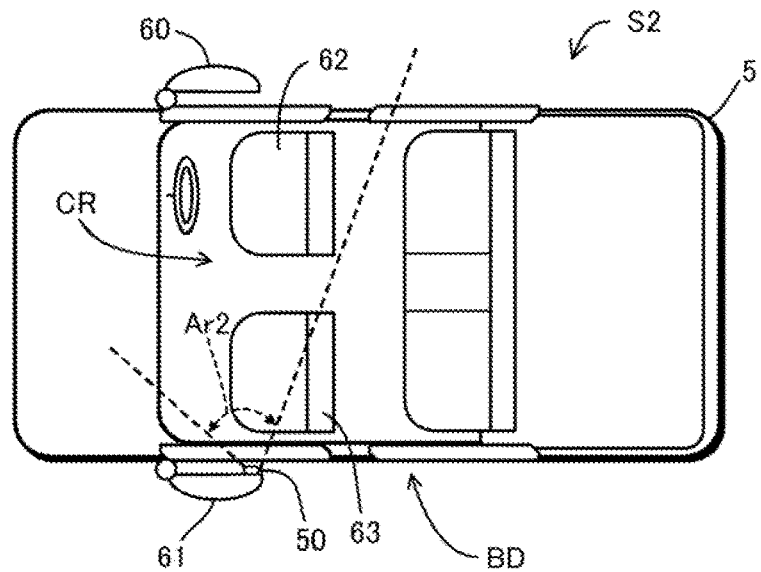

Further, S2 in FIG. 2 shows an interior image capture state, in which the left and right side-view mirrors 60, 61 are closed and the interior CR of the vehicle 5 is within an image capture range Ar2 of the camera 50. In the present embodiment, the vehicle 5 has the steering wheel on the right side, and the camera 50 is only mounted to the left side-view mirror 61, which is the side-view mirror on the side of the passenger seat 63. Therefore, in the interior image capture state, the camera 50 can especially capture an image of the vicinity of the driver seat 62 in the interior CR.

It should be noted that the exterior image capture state is not limited to a state in which the left side-view mirror 61 is completely open, but also includes a state in which the left side-view mirror 61 is in a pivoted position between the completely open position and the closed position and at least part of the exterior BD of the vehicle 5 is within the image capture range of the camera 50. Likewise, the interior image capture state is not limited to a state in which the left side-view mirror 61 is closed, but also includes a state in which the left side-view mirror 61 is in a pivoted position between the completely open position and the closed position and at least part of the interior CR of the vehicle 5 is within the image capture range of the camera 50.

The vehicle inspection device 10 is composed of a CPU 20 (corresponding to the vehicle processor of the present invention) and a memory 30, etc., which, by executing a control program for the vehicle inspection device 10 stored in the memory 30, function as an image capture control unit 21, a captured image transmission unit 22, an automatic closing operation recognition unit 23, and a return time estimation unit 24.

It should be noted that while the present embodiment is configured such that an image of the exterior BD and the interior CR of the vehicle 5 captured by the camera 50 is analyzed by the image analysis server 210, the vehicle inspection device 10 may be configured to include an image analysis unit 25. In this case, the CPU 20 functions as the image analysis unit 25 by executing a control program 31, and analyzes the image of the exterior BD and the interior CR of the vehicle 5 in the same manner as the image analysis server 210 described below.

The image capture control unit 21 executes a vehicle image capture process of capturing an image of the exterior BD of the vehicle 5 using the camera 50 when the camera 50 is in the exterior image capture state, and capturing an image of the interior CR of the vehicle 5 using the camera 50 when the camera 50 is in the interior image capture state. The image capture control unit 21 stores a captured image 32 of the exterior BD and the interior CR of the vehicle 5 in the memory 30. Hereinafter, the captured image of the exterior BD and the interior CR of the vehicle 5 stored in the memory 30 will be referred to as an inspection image Pd. The captured image transmission unit 22 transmits the inspection image Pd to the image analysis server 210.

The automatic closing operation recognition unit 23 recognizes, through communication with the ECU 41, an automatic closing operation of the left and right side-view mirrors 60, 61 when the vehicle 5 is not in use (such as when the ignition is switched off, etc.). The return time estimation unit 24 estimates, through communication with the ECU 41, that the vehicle 5 has been returned. The return time estimation unit 24 estimates that the vehicle 5 has been returned when, for example, it recognizes that the vehicle 5 has been returned to a predetermined return location and the user U has performed a return operation with respect to a vehicle-mounted device.

As described below, the image capture control unit 21 executes the vehicle image capture process when the return time estimation unit 24 has estimated that the vehicle 5 has been returned and the automatic closing operation recognition unit 23 has recognized an automatic closing operation of the left and right side-view mirrors 60, 61.

2. Vehicle Image Capture and Image Analysis Process

Figure 3:
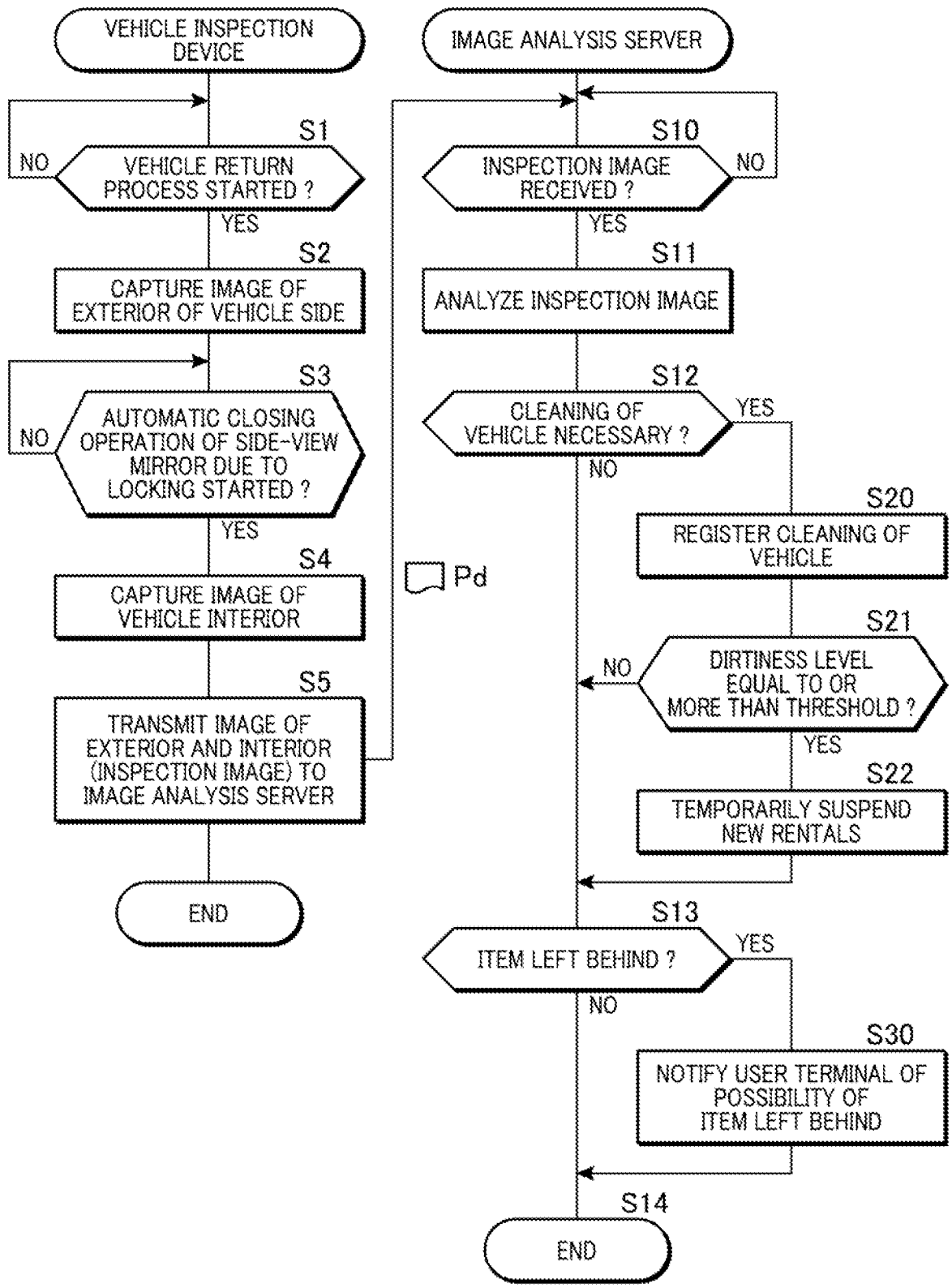
FIG. 3 is a flowchart of an image capture and transmission process of an inspection image of a vehicle, and an analysis process of the inspection image.

A process flow of a vehicle image capture process executed by the vehicle inspection device 10 and an analysis processes executed by the image analysis server 210 with respect to the inspection image according to the flowchart shown in FIG. 3 will now be described. Processing in the image analysis server 210 is performed by the above CPU (server processor) provided to the image analysis server 210 executing a control program for the image analysis server 210 stored in the memory.

In the vehicle inspection device 10, when a return process of the vehicle 5 has been started by the return time estimation unit 24 at step S1, the image capture control unit 21 advances the process flow to step S2, and captures an image of the exterior of the vehicle 5 using the camera 50. When the automatic closing operation recognition unit 23 has recognized that an automatic closing operation of the left and right side-view mirrors 60, 61 has started in the following step S3, the image capture control unit 21 advances the process flow to step S4, and captures an image of the interior CR of the vehicle 5 using the camera 50. In the next step S5, the captured image transmission unit 22 transmits the image (inspection image) Pd of the exterior BD and the interior CR of the vehicle 5 to the image analysis server 210.

When the image analysis server 210 has received the inspection image Pd transmitted from the vehicle inspection device 10 in step S10, the process flow advances to step S11 to analyze the inspection image. Specifically, the image analysis server 210 compares the inspection image Pd to images of the exterior BD and the interior CR of the vehicle 5 before rental stored in advance in an inspection image data base (DB) 211 to calculate changes in the exterior BD and the interior CR.

In the following step S12, the image analysis server 210 determines based on the degree of change in the image of the exterior BD and the interior CR whether or not cleaning of the vehicle 5 is necessary. The image analysis server 210 advances the process flow to step S20 if it has determined that cleaning of the vehicle 5 is necessary, and to step S13 if it has determined that cleaning of the vehicle 5 is not necessary.

In step S20, the image analysis server 210 transmits cleaning request information requesting registration of cleaning of the vehicle 5 to the vehicle rental server 200 to register cleaning of the vehicle 5. Cleaning of the vehicle 5 is thereby arranged by the vehicle rental server 200. In the following step S21, the image analysis server 210 determines whether or not a dirtiness level of the vehicle 5 is equal to or more than a threshold. The image analysis server 210 advances the process flow to step S22 if it has determined that the dirtiness level of the vehicle 5 is equal to or more than the threshold, and to step S13 if it has determined that the dirtiness level of the vehicle 5 is less than the threshold.

In step S22, the image analysis server 210 transmits reservation suspension request information requesting temporary suspension of new reservations of the vehicle 5 to the vehicle rental server 200, and advances the process flow to step S13. A process of temporarily suspending rental of the vehicle 5 is thereby executed by the vehicle rental server 200.

In step S13, the image analysis server 210 determines based on the result of the analysis of the image of the interior CR whether or not the user U has left any items behind in the interior CR of the vehicle 5. The image analysis server 210 advances the process flow to step S30 if an item has been left behind, and to step S14 if no items have been left behind.

In step S30, the image analysis server 210 sends left item notification information to the user terminal 100, notifying the user of a possibility that an item has been left behind in the vehicle 5. The user U can recognize that he or she has left an item behind in the vehicle 5 by looking at the left item notification information displayed on a display unit of the user terminal 100.

3. Left Item Confirmation Process

Figure 4:
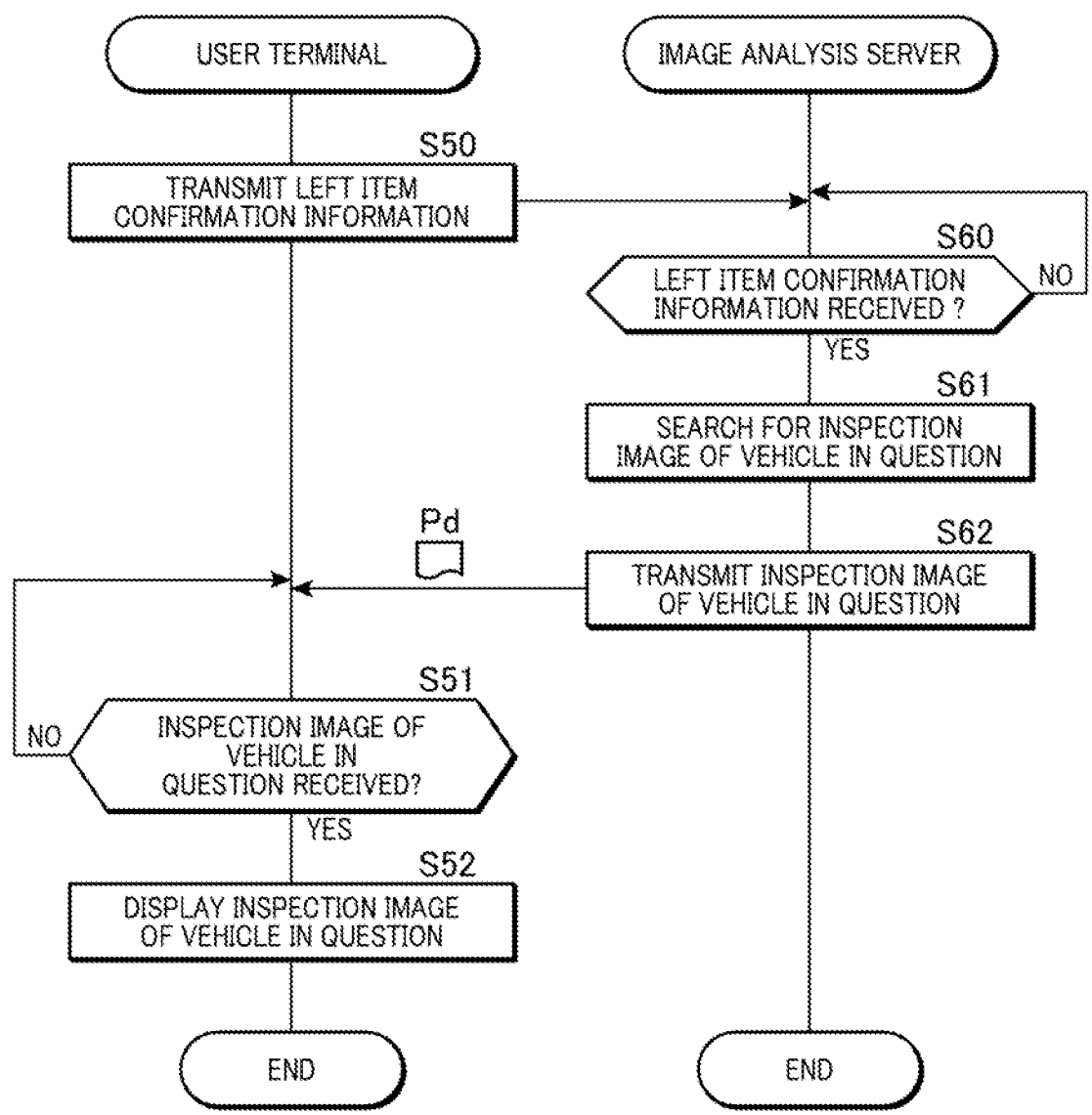
FIG. 4 is a flowchart of a process of transmitting an inspection image of a used vehicle from an image analysis server to a user terminal responsive to a user request.

A process flow of a left item confirmation process executed by the user terminal 100 and the image analysis server 210 according to the flowchart shown in FIG. 4 will now be described.

In step S50, the user terminal 100 transmits, responsive to an operation by the user U, left item confirmation information to the image analysis server, requesting confirmation of the presence of items left behind in the vehicle 5. When the image analysis server 210 has received the left item confirmation information from the user terminal 100 in step S60, the process flow advances to step S61.

In step S61, the image analysis server 210 searches the inspection image DB 211 and extracts an inspection image confirming left items in the vehicle in question (vehicle 5 in this case). In the following step S62, the image analysis server 210 transmits the inspection image of the vehicle in question to the user terminal 100. It should be noted that since only the presence of items left behind in the vehicle 5 need be confirmed in this case, transmitting only the image of the interior CR of the inspection image (image of the exterior BD and the interior CR of the vehicle 5) will suffice.

When the user terminal 100 has received the inspection image of the vehicle in question from the image analysis server 210 in step S51, the process flow advances to step S52. In step S52, the user terminal 100 displays the inspection image of the vehicle in question (vehicle 5) on a display unit. The user U can confirm whether or not he or she has left an item behind in the vehicle 5 by looking at the inspection image of the vehicle 5 displayed on the display unit of the user terminal 100.

4. Vehicle Confirmation Process

A vehicle confirmation process executed by the user terminal 100 and the image analysis server 210 according to the flowchart shown in FIG. 5 will be described.

In step S70, the user terminal 100 transmits, responsive to an operation by the user U, reserved vehicle confirmation information to the image analysis server 210, requesting confirmation of a reserved vehicle. The user U can reserve a vehicle by executing a carsharing app (application program) or the like provided by the vehicle rental server 200 on the user terminal 100, or by accessing a rental website of the vehicle rental server 200.

When the image analysis server 210 has received the reserved vehicle confirmation information from the user terminal 100 in step S80, the process flow advances to step S81. In step S81, the image analysis server 210 searches the inspection image DB 211 and extracts a recent inspection image of the reserved vehicle. In the following step S82, the image analysis server 210 transmits the inspection image of the reserved vehicle to the user terminal 100.

When the user terminal 100 has received the inspection image of the reserved vehicle from the image analysis server 210 in step S71, the process flow advances to step S72. In step S72, the user terminal 100 displays the inspection image of the reserved vehicle on the display unit. The user U can confirm the degree of dirtiness and presence of damage etc. of the reserved vehicle by looking at the inspection image of the reserved vehicle displayed on the display unit of the user terminal 100. If the user U determines that the degree of dirtiness and damage of the reserved vehicle is unacceptable, he or she can respond by cancelling the reservation, etc.

5. Other Embodiments

In the above embodiment, the inspection image Pd of the vehicle 5 captured by the camera 50 is transmitted to the image analysis server 210 for analysis. As another configuration, as mentioned above, the vehicle inspection device 10 may include an image analysis unit 25, which may be configured to execute the same processes as the processes executed by the image analysis server 210 according to the flowcharts shown in FIG. 3 to FIG. 5. In this case, there is no need for the vehicle inspection device 10 to include the captured image transmission unit 22.

In the above embodiment, the vehicle inspection device 10 includes an automatic closing operation recognition unit 23 and a return time estimation unit 24, but a configuration including only one of the automatic closing operation recognition unit 23 and the return time estimation unit 24 is also possible. Alternatively, both the automatic closing operation recognition unit 23 and the return time estimation unit 24 may be omitted. In this case, for example, the image capture control unit 21, responsive to an operation by the user U, instructs the ECU 41 to open/close the left side-view mirror 61 to open/close the left side-view mirror 61 and capture an image of the exterior BD and the interior CR of the vehicle 5 using the camera 50.

In the above embodiment, the camera 50 is mounted only to the left side-view mirror 61 which is the side-view mirror on the side of the passenger seat 63, but a camera 50 may also be mounted to the right side-view mirror 60, which is the side-view mirror on the side of the driver seat 62. Mounting a camera 50 to both of the left and right side-view mirrors 60, 61 allows for images of the exterior and interior of the vehicle 5 to be captured in a wider range.

In the above embodiment, the image capture range of the camera 50 is changed according to an opening/closing operation of the left side-view mirror 61, but a mechanism for changing the orientation of the camera 50 may be provided separately from the opening/closing operation of the left side-view mirror 61 to further widen the image capture range of the camera 50.

In the above embodiment, in case the vehicle 5 has a peripheral monitoring function based on images captured by camera, the cameras mounted to the left and right side-view mirrors 60, 61 for capturing images of the sides of the vehicle 5 may also be used as the cameras 50 for capturing images of the exterior and the interior.

It should be noted that, in order to facilitate understanding of the present invention, FIG. 1 is a schematic view showing the configuration of the vehicle inspection device 10 and the image analysis server 210 divided into sections by main processing content, and that the configuration of the vehicle inspection device 10 and the image analysis server 210 may be divided in other ways. In addition, the process of each component may be executed by a single hardware unit, or by a plurality of hardware units. Further, the process by each component shown in FIG. 3 to FIG. 5 may be executed by a single program, or by a plurality of programs.

6. Configurations Supported by the Above Embodiment

The above embodiment provides concrete examples of the following configurations.

(First configuration) A vehicle inspection device including a camera mounted to a power folding side-view mirror provided to a vehicle, the camera being configured to switch between an exterior image capture state in which an exterior of the vehicle is within an image capture range and an interior image capture state in which an interior of the vehicle is within the image capture range, while the side-view mirror performs an opening/closing operation between a completely open state and a closed state, and a vehicle processor configured to execute a vehicle image capture process of capturing an image of the exterior of the vehicle by the camera when the camera has entered the exterior image capture state due to an operation of the side-view mirror, and capturing an image of the interior of the vehicle by the camera when the camera has entered the interior image capture state due to an operation of the side-view mirror.

According to the vehicle inspection device of the first configuration, an opening/closing operation of a side-view mirror of a vehicle switches an image capture range of a camera mounted to the side-view mirror between an exterior image capture state and an interior image capture state, allowing for image capture of both the exterior and the interior of the vehicle. It is thus possible to prevent an increase in cost and design complexity of the image capture unit than in a case where a camera for capturing an image of the vehicle exterior and a camera for capturing an image of the vehicle interior are provided separately.

(Second configuration) The vehicle inspection device according to the first configuration, wherein the vehicle processor executes the vehicle image capture process upon recognition of an automatic closing operation of the side-view mirror associated with locking of the vehicle.

According to the vehicle inspection device of the second configuration, the vehicle image capture process can be executed efficiently at the start of the automatic closing operation of the side-view mirror associated with locking of the vehicle.

(Third configuration) The vehicle inspection device according to the first configuration or the second configuration, wherein the camera is mounted only to a side-view mirror on a passenger seat side of the vehicle.

According to the vehicle inspection device of the third configuration, in a case where the number of cameras to be mounted is limited to one, it is possible to prioritize capturing an image of the vicinity of the driver seat, which is assumed to see longer use compared to other seats, using the camera mounted to the side-view mirror on the passenger seat side.

(Fourth configuration) The vehicle inspection device according to any one of the first to third configurations, wherein the vehicle is a rental vehicle, and the vehicle processor estimates a return time of the rental vehicle and executes the vehicle image capture process at the return time.

According to the vehicle inspection device of the fourth configuration, it is possible to capture an image of the exterior and the interior of a rental vehicle at the time of returning the rental vehicle.

(Fifth configuration) A vehicle inspection system including a vehicle inspection device which includes a camera mounted to a power folding side-view mirror provided to a vehicle, the camera being configured to switch between an exterior image capture state in which an exterior of the vehicle is within an image capture range and an interior image capture state in which an interior of the vehicle is within the image capture range, while the side-view mirror performs an opening/closing operation between a completely open state and a closed state, and a vehicle processor configured to execute a vehicle image capture process of capturing an image of the exterior of the vehicle by the camera when the camera has entered the exterior image capture state due to an operation of the side-view mirror and capturing an image of the interior of the vehicle by the camera when the camera has entered the interior image capture state due to an operation of the side-view mirror, and to transmit an image of the exterior and the interior of the vehicle captured by the vehicle image capture process, and an image analysis server having a server processor configured to receive the image of the exterior and the interior of the vehicle transmitted by the vehicle processor, and execute an image analysis process of analyzing the image of the exterior and the interior of the vehicle.

According to the vehicle inspection system of the fifth configuration, an image analysis process of an image of the exterior and interior of a vehicle captured by an image capture process is executed by an image analysis server, which eliminates the need for an image analysis process by the vehicle inspection device and thus allows for reducing the load of the vehicle inspection device.

(Sixth configuration) The vehicle inspection system according to the fifth configuration, wherein the server processor determines, by the image analysis process, whether or not cleaning of the vehicle is necessary.

According to the vehicle inspection system of the sixth configuration, the image analysis process makes it easy to determine whether cleaning of the vehicle is necessary.

(Seventh configuration) The vehicle inspection system according to the fifth configuration, wherein the vehicle is a rental vehicle, and the server processor, upon determining, by the image analysis process, that a dirtiness of the rental vehicle is equal to or more than a predetermined level, suspends rental of the rental vehicle.

According to the vehicle inspection system of the seventh configuration, when the rental vehicle is very dirty, rental of the rental vehicle is suspended, making it possible to prevent discomforting a user of the rental vehicle.

(Eighth configuration) The vehicle inspection system according to any one of the fifth to seventh configurations, wherein the vehicle is a rental vehicle, and the server processor determines, by the image analysis process, whether there is a left item in the interior of the rental vehicle, and upon determining that there is a left item, transmits left item notification information notifying a left item to a user terminal used by a user who used the rental vehicle.

According to the vehicle inspection system of the eighth configuration, the image analysis process makes it possible to easily determine whether an item has been left behind in the interior of the vehicle.

REFERENCE SIGNS LIST

1 Vehicle inspection system
5 Vehicle
10 Vehicle inspection device
20 CPU (vehicle processor)
21 Image capture control unit
22 Captured image transmission unit
23 Automatic closing operation recognition unit
24 Return time estimation unit
25 Image analysis unit
30 Memory
31 Control program
32 Captured image
40 Communication unit
41 ECU
50 Camera
60 Right side-view mirror (driver seat-side side-view mirror)
61 Left side-view mirror (passenger seat-side side-view mirror)
62 Driver seat
63 Passenger seat
100 User terminal
200 Vehicle rental server
210 Image analysis server
211 Inspection image data base
500 Communication network
U User
S1 Exterior image capture state
S2 Interior image capture state
Pd Inspection image

What is claimed is:

1. A vehicle inspection device comprising:
a camera mounted to a power folding side-view mirror provided to a vehicle, the camera being configured to switch between an exterior image capture state in which an exterior of the vehicle is within an image capture range and an interior image capture state in which an interior of the vehicle is within the image capture range, while the side-view mirror performs an opening/closing operation between a completely open state and a closed state; and
a vehicle processor configured to execute a vehicle image capture process of capturing an image of the exterior of the vehicle by the camera when the camera has entered the exterior image capture state due to an operation of the side-view mirror, and capturing an image of the interior of the vehicle by the camera when the camera has entered the interior image capture state due to an operation of the side-view mirror;
wherein the vehicle is a rental vehicle, and the vehicle processor estimates a return time of the rental vehicle and executes the vehicle image capture process at the return time.

2. The vehicle inspection device according to claim 1, wherein the vehicle processor executes the vehicle image capture process upon recognition of an automatic closing operation of the side-view mirror associated with locking of the vehicle.

3. The vehicle inspection device according to claim 1, wherein the camera is mounted only to a side-view mirror on a passenger seat side of the vehicle.

4. A vehicle inspection system comprising:
a vehicle inspection device comprising:
a camera mounted to a power folding side-view mirror provided to a vehicle, the camera being configured to switch between an exterior image capture state in which an exterior of the vehicle is within an image capture range and an interior image capture state in which an interior of the vehicle is within the image capture range, while the side-view mirror performs an opening/closing operation between a completely open state and a closed state; and
a vehicle processor configured to execute a vehicle image capture process of capturing an image of the exterior of the vehicle by the camera when the camera has entered the exterior image capture state due to an operation of the side-view mirror and capturing an image of the interior of the vehicle by the camera when the camera has entered the interior image capture state due to an operation of the side-view mirror, and to transmit an image of the exterior and the interior of the vehicle captured by the vehicle image capture process; and
an image analysis server having a server processor configured to receive the image of the exterior and the interior of the vehicle transmitted by the vehicle processor, and execute an image analysis process of analyzing the image of the exterior and the interior of the vehicle;
wherein the vehicle is a rental vehicle, and the vehicle processor estimates a return time of the rental vehicle and executes the vehicle image capture process at the return time.

5. The vehicle inspection system according to claim 4, wherein the server processor determines, by the image analysis process, whether or not cleaning of the vehicle is necessary.

6. The vehicle inspection system according to claim 4, wherein the vehicle is a rental vehicle, and the server processor, upon determining that a dirtiness of the rental vehicle is equal to or more than a predetermined level, suspends rental of the rental vehicle.

7. The vehicle inspection system according to claim 4, wherein the vehicle is a rental vehicle, and the server processor determines, by the image analysis process, whether there is a left item in the interior of the rental vehicle, and upon determining that there is a left item, transmits left item notification information notifying a left item to a user terminal used by a user who used the rental vehicle.

* * * * *